Jan. 3, 1961 L. E. MILLS Re. 24,918
DISPENSING PACKAGE AND METHOD
Original Filed Oct. 7, 1949
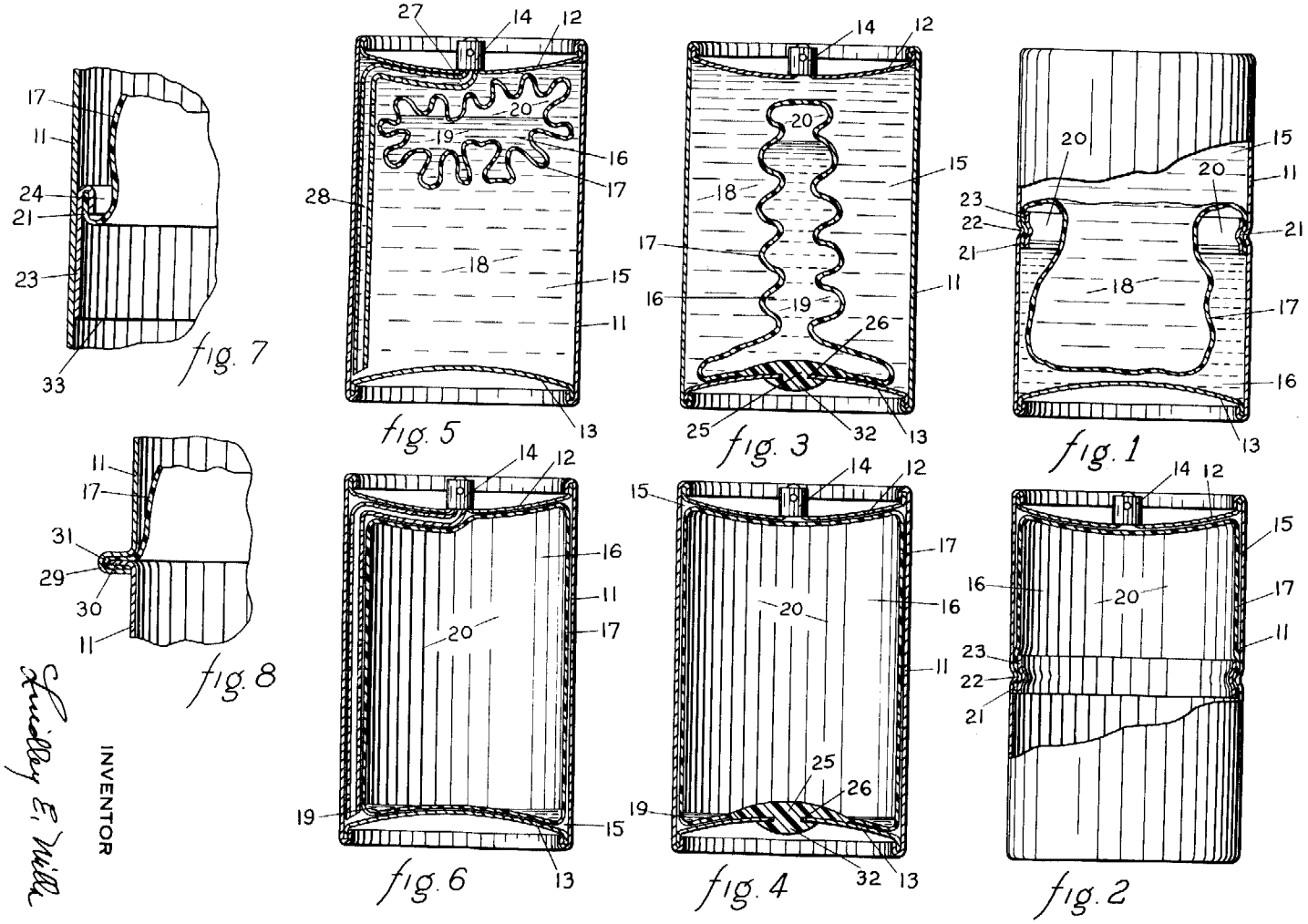
INVENTOR
Lindley E. Mills United States Patent Office Re. 24,918
Reissued Jan. 3, 1961

24,918

DISPENSING PACKAGE AND METHOD

Lindley E. Mills, Kalamazoo, Mich.

Original No. 2,815,152, dated Dec. 3, 1957, Ser. No. 120,193, Oct. 7, 1949. Application for reissue Dec. 2, 1958, Ser. No. 777,803

4 Claims. (Cl. 222—386.5)

Matter enclosed in heavy brackets [ ] appears in the original patent but forms no part of this reissue specification; matter printed in italics indicates the additions made by reissue.

This invention relates to a package and a method for dispensing products, particularly to a package and method whereby a liquid product can be stored and dispensed under pressure without contamination thereof with a low-boiling propellant.

The dispensing of many substances, such as insecticides, deodorants, paints, lacquers and the like directly from packages wherein they are stored and transported under pressure is of considerable importance in industry. The effectiveness of the aerosol "bomb" as a means of dispensing certain insecticides is well known. The ways in which liquids have heretofore been dispensed under pressure have depended primarily either upon including in the liquid mixture which it is desired to dispense a considerable proportion of a substance boiling below the dispensing temperature or upon charging a container containing the desired liquid with a gas having a limited solubility in the liquid, the composition being stored in and dispensed from a suitable container fitted with an appropriate dispensing valve.

In the first of these methods the active ingredient, such as a deodorant, insecticide or the like, is dissolved in a liquid medium which contains a sufficiently high proportion of a low-boiling liquid to provide a mixture having a vapor pressure sufficiently high to cause the liquid to be ejected forcibly from the container when the dispensing valve is open. Low-boiling liquids which have been used include the chlorofluoromethanes, methyl chloride, methylene chloride, methyl bromide and others as well as mixtures thereof.

It is apparent that in this method, the low-boiling liquid, generally referred to as a propellant, is actually a component of the product which is dispensed. The particular propellant and the other ingredients of the mixture used must be chosen carefully so that they will be miscible in all proportions and this has limited greatly the products which can be dispensed in this way. Products, for example, which are soluble in water but which are insoluble in organic liquids are difficult to dispense in this manner because none of the propellants which are commonly available for use are miscible with water. As a safety precaution the propellant should vaporize to form a non-flammable vapor because it is vaporized into the space being treated. Furthermore, the suitable and available propellants are all relatively costly and, since they generally comprise from 20 to 65 percent or more of the mixture, this renders the method unduly expensive. The true aerosols, which contain a high proportion of propellant and are often referred to as "high-pressure aerosols," are not well suited to use out of doors, e.g. in the spraying of plants, because they are formulated to produce a non-settling dispersion which is rapidly dissipated in the air before it can contact the surface of the plant or other article which it is desired to treat.

To overcome these and other difficulties and to provide products which can be used more advantageously to coat surfaces, the so-called "low-pressure aerosols" have more recently been used. These contain a lower proportion of low-boiling propellant than do the high-pressure aerosols or, in some instances, a lower-boiling propellant, and a higher proportion of non-volatile or only slowly volatile constituents which it is desired to dispense. Low-pressure aerosol formulations containing insecticides, cosmetics, perfumes, deodorants, lacquers, paints, waxes and other products have been used with considerable success.

It is apparent, however, that even in the low-pressure aerosols a considerable proportion of the propellant must be included in the formulation to maintain a suitable pressure in the container. In formulations designed for the coating of surfaces, or in the dispensing of non-volatile or only slowly volatile substances for any purpose, the sole function of the propellant is to generate pressure within the container, the greater proportion of it evaporating immediately upon contact of the dispensed product with the air. Not only does the use of the necessary proportion of propellant even in a low-pressure aerosol add unduly to the cost of the formulation, but its presence constitutes a contaminant of the product which is often undesirable and which, furthermore, decreases the useful volume of the container with respect to the non-volatile or only slowly volatile components of the formulation. As is apparent from the above, and as is well recognized in the trade, the dispensing of products under pressure utilizing either the high- or low-pressure aerosol techniques heretofore known leaves much to be desired in the way of versatility of product which can be dispensed, of non-contanimation of the product with a propellant and of low cost.

In the second method referred to previously, the liquid product is packaged in a container having a suitable dispensing valve and the container then charged with air, carbon dioxide, nitrogen or other gaseous product of low or limited solubility in the liquid. This method has an advantage over the aerosol method for many purposes in that the product can be dispensed with a minimum of evaporation of the solvent, particularly when relatively high-boiling solvents are used, and without substantial contamination thereof with the propellant. It has the very great disadvantage, however, that the pressure in the container decreases rapidly and to a small fraction of its original value as the liquid is dispensed therefrom unless provision is made to re-charge or re-pressure the container with the gas at intervals during the dispensing of the liquid. The method is entirely unsuited for use where means for re-pressuring is unavailable. For these and other reasons the latter method is not feasible for use in the packaging of products which are intended to be used by dispensing directly from the package under pressure after storage or transportation.

It is apparent that a method or a package which would overcome the difficulties inherent in both of the methods described and which would permit the dispensing under pressure of substantially all of a useful fluid composition from a container under a constant dispensing pressure without the necessity of including a propellant in the composition or of recharging the container with a gas during the dispensing would be of great value.

It is, therefore, an object of the present invention to provide a method for dispensing a fluid from a container.

An additional object is to provide a method whereby a fluid can be stored in a container and dispensed therefrom under pressure as desired.

An additional object is to provide a method whereby a fluid can be stored under pressure in a container and subsequently dispensed substantially entirely therefrom without appreciable decrease in the dispensing pressure.

An additional object is to provide a method whereby a fluid having a boiling range substantially above atmospheric temperature can be stored under pressure in a container and dispensed therefrom under substantially constant pressure as desired without re-pressuring the container during the dispensing operation.

An additional object is to provide a method whereby a fluid can be stored under pressure in a container and subsequently dispensed therefrom as desired without contamination with a propellant gas.

An additional object is to provide a package or container in which a fluid can be stored under pressure and from which it can be dispensed as desired.

An additional object is to provide a package in which a fluid can be stored under pressure and from which it can be dispensed as desired without substantial decrease in pressure inside the container during the dispensing operation.

An additional object is to provide a package of a fluid from which the fluid can be dispensed under pressure without contamination of the fluid with a propellant gas.

An additional object is to provide a package of a fluid under pressure from which the fluid can be dispensed at substantially constant pressure without inclusion of a propellant in the fluid, and without re-pressuring the container during the dispensing operation.

An additional object is to provide a method for filling a suitable multi-chamber container with a fluid product and a propellant wherefrom the product can be dispensed under pressure without contaminating it with the propellant.

Other objects will be apparent as the description proceeds.

According to the present invention these and related objects are accomplished economically and conveniently by providing a suitable container fabricated of metal, glass, plastic, or any other suitable material, which is divided by a flexible diaphragm into two non-communicating compartments or chambers. One of the compartments, herein referred to as the "product compartment" or "product chamber" is adapted to contain a fluid product, herein for convenience referred to simply as the "product," which it is desired to dispense from the container under pressure. The container is also equipped with suitable means, such as a dispensing valve, communicating with the product chamber through which the product can be dispensed in suitable form as desired. The other compartment, herein referred to as the "propellant compartment" or "propellant chamber" is adapted to contain a compound or a mixture of compounds, herein referred to as a "propellant" having a boiling point or a boiling range such that the vapor pressure of the compound or mixture at the desired dispensing temperature is substantially equal to the desired dispensing pressure. Suitable means can also be provided to introduce a propellant into the propellant chamber and a product into the product chamber after the container and flexible diaphragm have been completely assembled, if desired, or the product and propellant can be introduced into the respective chambers prior to the final assembling or closing operation.

A fluid product which it is desired to dispense and a suitable propellant are introduced into the respective chambers as hereinafter described, the propellant being at least principally in liquid from in the full package. A propellant is used having a vapor pressure, i.e. a vapor-liquid equilibrium pressure, substantially equal to the dispensing pressure at the dispensing temperature, i.e. equal to the desired pressure inside the container at the temperature at which the dispensing operation is carried out.

The product can then be dispensed by opening the dispensing valve, or other dispensing means, whereupon the product is ejected forcibly from the product chamber by the pressure exerted on the flexible diaphragm by the propellant in the propellant chamber. As more product is forced from the product chamber, the diaphragm flexes due to the pressure of the propellant on it, the volume of the product chamber accommodating itself automatically to the volume of product remaining in it and the volume of the propellant chamber becoming correspondingly greater. Sufficient propellant is preferably used in the propellant chamber to provide a volume of vapor under the dispensing temperature and pressure at least substantially as great as the internal volume of the container, i.e. as great as the sum of the volumes of the product chamber and the propellant chamber. The pressure of the propellant on the diaphragm and, consequently, the dispensing pressure is thus maintained substantially constant until all of the product has been forced from the product chamber.

The flexible diaphragm can be formed of any suitable material which will resist the chemical and solvent action of the product and of the propellant and which is impervious to both. The diaphragm is formed or shaped and positioned in the container in any suitable way such that, when it is flexed in one direction, the product chamber can become substantially equal in volume to the entire volume of the container, the volume of the propellant chamber being correspondingly small, and, when it is flexed in the other direction, the magnitudes of the volumes of the two chambers can be reversed. The diaphragm is preferably formed so that it can assume either of these two extreme positions, or any position therebetween, by flexing but without substantial stretching or elastic deformation.

The diaphragm can conveniently be shaped to correspond approximately to the shape of the inner surface of one of two similarly shaped halves of the container and mounted on or secured to the inner surface of the container adjacent the juncture of the two halves in such a way that upon flexing in one direction or the other, it can lie in substantial contact with the inner surface of one or the other of the halves. Alternatively, it can be formed as a bag of suitable shape and dimensions which can be suitably secured to the inner wall of the container, generally around an area including a means whereby a propellant or a product can be introduced into the container or around a connection to a product dispensing means as will hereinafter be more fully apparent.

In still another and often preferred alternative arrangement of the parts, the diaphragm can be formed in the shape of a closed flexible-walled capsule or balloon enclosing the propellant chamber which when collapsed is of small volume and which when inflated within the limit of its flexural deformation fills substantially the entire container, but which is unattached to the container wall and is, therefore, free to move freely inside the container and to assume any position or shape therein depending upon the amount of product in the container, the relative densities of the product and of the capsule of propellant, and other factors. Under optimum conditions, the diaphragm is formed from a material which is sufficiently flexible to require only a small amount of work to flex it from one extreme position to the other. It is, of course, advisable that the parts be arranged so as to permit free flow of product to the dispensing means regardless of the position or shape of the propellant chamber as will be explained hereinafter. The dispensing valve for dispensing the product from the product chamber can be of any convenient type and can be adapted to dispense the product as a spray or as a solid stream as desired.

The product dispensed can be in the form of a true solution, a suspension of a solid in a liquid, an emulsion or other mixture of incompletely miscible liquids, a paste, a gas or in any other flowable form. The total volume of the diaphragm and the propellant chamber in a filled package rarely need exceed 10 percent, usually less, of the entire volume of the container. The package is generally prepared so that a small proportion of the volume of the propellant chamber is filled with propellant vapor rather than with liquid to eliminate the possibility of hydrostatic pressure developing in the container should it be subjected to unduly high temperatures. Alternatively a suitable volume of air or other gas can be included with the product in the product chamber, if desired.

It is apparent that, since the volume of the propellant liquid in the propellant chamber is always small compared to the volume of the fluid product dispensed, the drop in temperature of the propellant caused by its vaporization will be so slight as to be negligible even though the product be dispensed rapidly and completely from the container since sufficient heat will be absorbed rapidly through the propellant chamber walls to supply the necessary heat of vaporization. Since sufficient propellant is used in the propellant chamber to maintain the liquid and vapor in equilibrium with one another throughout substantially the entire dispensing operation, there will be no drop in pressure in the container caused by expansion of the gaseous propellant as is the case when a container is pressurized with air or other entirely gaseous product.

Applicant is aware that accumulators, pneumatic storage devices, lubricators and various dispensing devices have been described having a product chamber separated from a pressurized chamber by a flexible diaphragm. However, in every instance heretofore described the pressure in the pressurized chamber has either been maintained substantially constant by intermittant or continuous introduction of a compressed gas into the pressurized chamber during the dispensing of the product or the product has simply been dispensed and the pressure in the pressurized chamber allowed to decrease as the product chamber becomes smaller and the pressurized chamber becomes larger. Applicant is aware of no instance wherein the pressurized or propellant chamber has been charged initially with a propellant having a vapor pressure substantially equal to the desired dispensing pressure at the dispensing temperature in such fashion and in such amount as to maintain the dispensing pressure substantially constant during the entire dispensing operation by vaporization of the propellant initially in the filled package.

The invention can be better understood by reference to the accompanying drawing wherein, in the interest of clarity, certain features are shown on a somewhat exaggerated scale and wherein:

Figure 1 is an elevation, principally in section, of a container of a liquid product and a propellant therefor embodying features of the invention, Figure 2 is an elevation corresponding to Figure 1, but showing the relationship of the parts after substantially all of the liquid product has been dispensed from the package, Figure 3 is a sectional elevation of a package of a liquid product and a propellant therefor embodying another modification of the invention, Figure 4 is an elevation corresponding to Figure 3, but showing the relationship of the parts after substantially all of the liquid product has been dispensed from the container, Figure 5 is a sectional elevation of a package of a liquid product and a propellant therefor embodying yet another modification of the invention, Figure 6 is a sectional elevation corresponding to Figure 5, but showing the relationship of the parts when substantially all of the liquid product has been dispensed from the container, Figure 7 is a fragmentary sectional elevation showing an alternate arrangement of certain of the parts, and Figure 8 is a fragmentary sectional elevation showing yet another alternate arrangement of certain of the parts.

In Figures 1 to 6, inclusive, there is shown a metal container having a cylindrical body wall 11 and dished top and bottom end members 12 and 13, respectively, secured thereto, it being understood that the container is purely conventional and can be formed in any shape or size and of any suitable material. A suitable dispensing valve 14, which is also conventional, is secured to the container at any suitable place, e.g. to the top end thereof, in suitable communication with a product chamber 15 within the container to permit dispensing of a liquid product from the chamber as herein described.

The interior of the container is divided into a product chamber 15 and a propellant chamber 16 by a flexible diaphragm 17 formed and positioned within the container in such fashion that, when it is flexed, preferably without elastic deformation, in one direction, the product chamber 15 is large, as in Figures 1, 3 and 5, and the propellant chamber 16 is small with respect to the total volume of the container and, when it is flexed in the other direction, the product chamber 15 is small, as in Figures 2, 4 and 6 and the propellant chamber 16 is large with respect to the total volume of the container. It is apparent that, neglecting the volumes of the diaphragm itself and of "dip pipes," as shown in Figures 5 and 6, or of other fixtures internal of the container which it may sometimes be advisable to use, the sum of the volumes of the product chamber 15 and of the propellant chamber 16 is substantially equal at all times to the internal volume of the container.

In one modification, as shown in Figures 1 and 2, the diaphragm 17 is cup-shaped and is formed to fit substantially one half the inner surface of the container. The edge section 21 of the diaphragm 17 adjacent its open end or side is secured tightly between a circumferentially central section 22 of the container body wall 11 and an internal bracing ring 23 of suitable width and circumference positioned within the open end of the cup-shaped diaphragm. The diaphragm can be secured in the container in the position just described by assembling the diaphragm 17 and the bracing ring 23 inside the container and then rolling an inwardly extending groove of suitable dimensions in the container wall 11 as is illustrated in Figures 1 and 2.

In an alternate arrangement of the parts shown in Figure 7, the bracing ring 23 is formed to fit snugly the inner surface of the container wall 11. One edge of the ring is turned inward on itself to form an inwardly projecting flange 24 leaving a groove between the flange and the main section of the ring. The ring is then slipped over the cup-shaped diaphragm so that the edge 21 of the latter projects into the groove. The flange 24 is then expanded outwardly so as to clamp the edge 21 of the diaphragm tightly and from a liquid-proof and vapor-proof joint. The diaphragm is then pulled through the ring out of the way, the ring and diaphragm are inserted into the cylindrical container body wall 11 to the proper location and the edge 33 of the ring opposite the flange 24 is soldered or brazed to the container body wall 11, the ring being of width sufficient to prevent the diaphragm from becoming overheated during the latter operation.

In still another alternate arrangement of the parts, shown in Figure 8, the container wall 11 is divided around its circumference into two sections, the sections being formed with flanges 29 and 30 which are deformed to form a rolled joint joining the sections together. The diaphragm 17 is formed with a flanged edge 31 which is clamped in the rolled joint to serve as a gasket and to position the edges of the diaphragm securely in a manner to prevent leakage from one chamber into the other.

The container illustrated in Figures 1, 2, 7 and 8 can be filled readily by introducing a suitable measured quantity of a desired fluid product 18, adapted to be dispensed through the dispensing valve 14, into the open, upright cup or chamber formed by one end of the body wall 11 and the diaphragm 17, but before either of the end members 12 or 13 is secured to the body wall 11. The end member 12 having a dispensing valve 14 secured thereto is then secured to the cylindrical body member 11 to form the product chamber 15 and to seal the product 18 therein, sufficient pressure being exerted meanwhile on the opposite side of the diaphragm to accommodate the volume of the product chamber 15 to the volume of the fluid product 18 and to prevent the inclusion of undue amounts of air with the product in the chamber. It is immaterial into which end of the container the product is introduced except that in certain instances, not shown in the drawing but contemplated by the invention, the dispensing valve 14 may be secured at some point to the main body member 11 rather than to one of the end members 12 or 13. In such instance the product should, of course, be introduced into the container on the same side of the diaphragm as the valve.

The partially filled container is then inverted and a suitable measured quantity of a suitable liquid propellant 19 is introduced into it on the side of the diaphragm opposite the product and the other end member 13 then secured in place to seal the propellant in the propellant chamber. Since the propellant is a low-boiling liquid, the operations of introducing it into the container and of sealing it in the propellant chamber are carried out under conditions of temperature and pressure suitable for retarding or substantially preventing its vaporization. A small amount of propellant vapor 20 is generally enclosed in the propellant chamber 16 to guard against development of hydrostatic pressure in the container when stored at unduly high temperatures.

In another modification illustrated in Figures 3 and 4, the flexible diaphragm 17 formed to fit approximately the inside surface of the container is deflated and cemented, heat sealed or otherwise secured to a plug 25 of self-sealing material, such as one of the plastic compositions sometimes used in the construction of self-sealing gasoline tanks. A projection 32 on one side of the plug 25 projects through a port 26 in the end member 13 of the container opposite the dispensing valve, the plug 25 being conveniently molded in contact with the end member 13 to secure a vapor- and liquid-tight joint prior to being joined to the diaphragm 17.

The container of the modification of Figures 3 and 4 can be filled by placing a suitable measured amount of a product 18 in the inverted container with the valve-bearing top end member 12 secured in place and then affixing the assembled bottom end member 13 with attached plug 25 and diaphragm 17 thereto under high vacuum to prevent the inclusion of gas in the product chamber 16. The propellant 19 can then be introduced into the propellant chamber 17 by piercing the self-sealing plug 25 with a hollow needle and injecting a measured amount of a suitable propellant, principally in liquid form through the needle. Upon withdrawing the needle, the hole formed by it is sealed effectively by the combined action of the substance from which the plug is formed and of the internal pressure in the container.

In the modification illustrated in Figures 5 and 6, the flexible diaphragm 17 is formed in the shape of a completely closed capsule, bladder or balloon to enclose the propellant chamber 16, a measured amount of a suitable propellant 19 being introduced into the chamber, usually under suitable conditions of temperature and pressure to maintain it substantially entirely in liquid form, prior to sealing the chamber. The sealed diaphragm enclosing the propellant, and a measured amount of the product which it is desired to dispense are placed together in the container prior to affixing the second end member thereto and the latter then secured in place to seal the container, the filling and sealing of the container being carried out under conditions of temperature and pressure to maintain the propellant principally in liquid form.

In the modification illustrated in Figures 5 and 6, the diaphragm 17 enclosing the propellant 19 in the propellant chamber 16 is not attached to the other parts of the container and is, therefore, free-floating in the container. The product chamber 15 comprises the space enclosed in the container lying outside and around the diaphragm. To prevent the diaphragm from floating against the port 27 for conducting product to the valve 14 and preventing the passage of fluid through it, a perforated tube 28 or other suitable fluid conducting means can be inserted in the port 27 to provide at all times a free passageway for the product to the port. Such means should lie as close as possible to the wall of the container to permit dispensing of as much as possible of the product from the container. Similar means can also be included in other modifications, such as those illustrated in Figures 1, 2, 3, 4, 7 and 8, if desired, but are not usually necessary.

The product 18 can be dispensed readily by simply opening the dispensing valve 14. As product is dispensed, the product chamber 15 becomes smaller and the propellant chamber 16 becomes correspondingly larger, the diaphragm 17 flexing and adjusting itself automatically to the changing volumes of the two chambers. As the propellant chamber 16 becomes larger the pressure therein and in the entire container is maintained by vaporization of additional propellant. When a constant boiling propellant is used, e.g. a pure compound or an azeotropic mixture, the pressure in the container will remain constant until all of the product has been dispensed, provided sufficient propellant is used to fill the propellant chamber when at its maximum volume with vapor at the dispensing pressure. To insure this, a slight excess of propellant is generally used, the excess remaining in liquid form in the propellant chamber 16 as at 19 in Figures 4 and 6, when all of the product has been dispensed. The pressure in the container will vary somewhat, of course, with change in temperature of the package and surroundings since the vapor pressure of the propellant will be affected thereby.

It is apparent that any product which can be dispensed through a suitable valve can be packaged, stored and dispensed as described herein. A number of such products have been mentioned previously. Dispensing pressures employed are limited only by the strength of the container and by the propellants available. For high pressures carbon dioxide, methane, ethane, methyl fluoride and other available low-boiling substances can be employed. Other, and generally higher-boiling substances, which can be employed to produce lower pressures include methyl chloride, dichlorodifluoromethane, methylene chloride, propane, butane, iso-butane and the like. Azeotropic mixtures having suitable vapor pressure characteristics can also be used.

The diaphragm can be formed of any suitable flexible material not subject to attack by the product or the propellant. It is, of course, apparent that the pressure on both sides of the diaphragm in the closed container are at all times substantially identical and that the diaphragm is not required to withstand any appreciable stress during storage or transportation of the filled container or during the dispensing of the product from the container. As an illustration of the economy of the herein described invention, it can be calculated that, for a container having a volume of one liter, considerably less than about one ounce of propellant will be required to maintain the dispensing pressure at about 45 pounds (gauge) per square inch at 70° F. This compares very favorably with the several ounces and often more than one pound of propellant which is required when the propellant is included directly in the formulation. Furthermore, since in the present invention the propellant is not dispensed from the container, questions of its flammabiliy or toxicity are of correspondingly less vital nature. Diaphragms formed of natural or synthetic rubber, polyvinyl chloride, neoprene, thiokol, polyethylene or from any other of a large number of substances can be used when using appropriate products and propellants.

Although the invention has been described with particular reference to the preferred method and package wherein the container is generally discarded after the product has been dispensed, it is pointed out that, when desired and as contemplated by the invention, the product chamber can be refilled with fluid product by pumping product into the chamber through any suitable valve or other device under a pressure higher than that exerted on the diaphragm by the propellant. Under such conditions the propellant vapor in the propellant chamber is condensed to the liquid form, the propellant chamber thus becoming smaller and the product chamber correspondingly larger to accommodate itself to the volume of product forced into it. The product thus introduced can then be dispensed as before and the cycle can be repeated as often as desired. In a further modification of the invention the container is secured in communication with a conduit or vessel, in which a fluid, such as water or air, is flowing or is stored, in a manner to permit free flow of the fluid between the product chamber and the conduit or vessel and functions as a pressure equalizer or as an accumulator operating under substantially constant pressure.

Although the invention has also been described principally with reference to a propellant consisting of substantially pure liquid or an azeotropic or other mixture having a substantially constant boiling point or a narrow boiling range, there is also contemplated the use of mixtures or systems of compounds of other sorts characterized by their development of pressure in the propellant chamber at the dispensing temperature. In certain instances it may be desirable to employ a propellant mixture comprising a highly volatile component together with a much less volatile component to provide for a controlled variation in the dispensing pressure under varying conditions of temperature during the dispensing operation or at different stages during the operation. Systems involving solutions of gases in single phase or poly phase liquids can be used, if desired, as can also systems involving a gaseous and a solid phase which are suitably responsive to the dispensing temperature and pressure to give substantially the results described.

I claim:

[1. An article of manufacture comprising a container, a product chamber and a propellant chamber inside the container separated from one another by a flexible diaphragm adapted to flex without elastic deformation to accommodate itself to variations in the volumes of the respective chambers, fluid-conducting means communicating with the product chamber, and a liquid propellant within the propellant chamber having a vapor pressure higher than the external pressure on the container, the diaphragm encircling the propellant entirely and being unattached to the wall of the container.]

*2. An article of manufacture for dispensing a fluid product, comprising: a container; a completely closed capsule within said container dividing the interior thereof into a product chamber surrounding said capsule and a propellant chamber within said capsule, said capsule being unattached to said container and being formed of flexible material of sufficient area that said capsule may inflate without stretching of said material from a collapsed condition of small volume to a condition wherein said capsule substantially fills said container; fluid-conducting means communicating with the product chamber; and a propellant within said closed capsule, said propellant having a vapor pressure higher than the external pressure on the container.*

*3. The article of claim 2 in which said propellant is a liquid.*

*4. The article of claim 2 in which said propellant is at least partially in solid form.*

*5. The article of claim 2 in which said propellant is carbon dioxide.*

References Cited in the file of this patent or the original patent

UNITED STATES PATENTS

| | | |
|---|---|---|
| 642,960 | Clibborn | Feb. 6, 1900 |
| 1,227,751 | Cobb | May 29, 1917 |
| 2,439,053 | Moore | Apr. 6, 1948 |
| 2,513,455 | Cornelius | July 4, 1950 |
| 2,689,768 | Falligant | Sept. 21, 1954 |

Dedication

Reissue No. 24,918.—*Lindley E. Mills*, Kalamazoo, Mich. DISPENSING PACKAGE AND METHOD. Reissue patent dated Jan. 3, 1961. Dedication filed June 26, 1968, by the inventor.

Hereby dedicates said patent to the Public.

[*Official Gazette November 19, 1968.*]